(12) United States Patent
Van Iseghem et al.

(10) Patent No.: US 11,736,061 B2
(45) Date of Patent: Aug. 22, 2023

(54) PHOTOVOLTAIC FACILITY

(71) Applicant: Electricite de France, Paris (FR)

(72) Inventors: Mike Van Iseghem, Thomery (FR); Romain Poivey, Paris (FR); Etienne Mallo, Paris (FR)

(73) Assignee: Electricite de France

( * ) Notice: Subject to any disclaimer, the term of this patent is extended or adjusted under 35 U.S.C. 154(b) by 0 days.

(21) Appl. No.: 17/752,165

(22) Filed: May 24, 2022

(65) Prior Publication Data
US 2022/0385230 A1 Dec. 1, 2022

(30) Foreign Application Priority Data

May 25, 2021 (FR) ...................... 2105423

(51) Int. Cl.
*H02S 40/00* (2014.01)
*H02S 20/32* (2014.01)
*E03B 3/02* (2006.01)

(52) U.S. Cl.
CPC ............... *H02S 40/00* (2013.01); *E03B 3/02* (2013.01); *H02S 20/32* (2014.12)

(58) Field of Classification Search
CPC ............ H02S 40/00; H02S 20/32; E03B 3/02
See application file for complete search history.

(56) References Cited

U.S. PATENT DOCUMENTS

| 9,016,292 | B1 | 4/2015 | Schneider et al. | |
|---|---|---|---|---|
| 2013/0306136 | A1* | 11/2013 | Hendrickson, Jr. | H02S 40/10 136/246 |
| 2017/0202155 | A1 | 7/2017 | Iwai | |

FOREIGN PATENT DOCUMENTS

| DE | 102013002825 A1 | 8/2014 |
|---|---|---|
| FR | 2973985 A1 | 10/2012 |
| NL | 2026267 B1 * | 8/2020 |
| WO | 2018146288 A1 | 8/2018 |
| WO | 2020059963 A1 | 3/2020 |

OTHER PUBLICATIONS

French Preliminary Search Report for Application No. 2105423 dated Apr. 25, 2022, 2 pages. [See p. 1, categorizing the cited references].

* cited by examiner

*Primary Examiner* — Jayne L Mershon
(74) *Attorney, Agent, or Firm* — Lerner David LLP

(57) ABSTRACT

The present invention relates to a photovoltaic facility (1) comprising a solar tracker (2) and at least one square or rectangular photovoltaic panel (3) mounted on the solar tracker (2), this solar tracker (2) enabling the inclination of the photovoltaic panel (3) to be varied with respect to the horizontal, so that two opposite edges of the photovoltaic panel, referred to as horizontal edges (31), are always horizontal whatever the inclination of the photovoltaic panel (3).

This facility is characterised in that it comprises at least one gutter (4) for recovering rainwater, in that this gutter (4) is mounted along one of the two horizontal edges (31) of the photovoltaic panel (3) using at least two anchoring devices (5), to which it is suspended, so that it can oscillate under the action of its own weight, about a horizontal axis of rotation (Y-Y'), so as to remain horizontal whatever the inclination of the photovoltaic panel (3).

9 Claims, 8 Drawing Sheets

[Fig. 1]
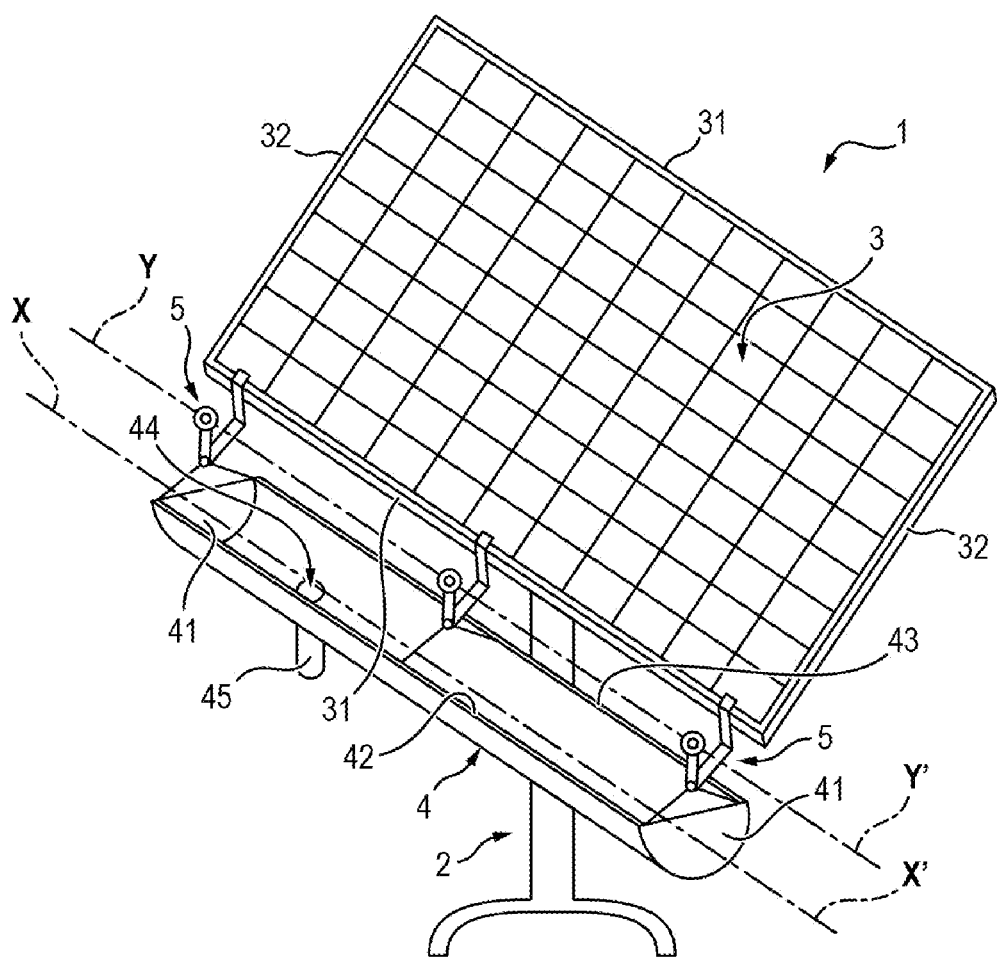

[Fig. 2]
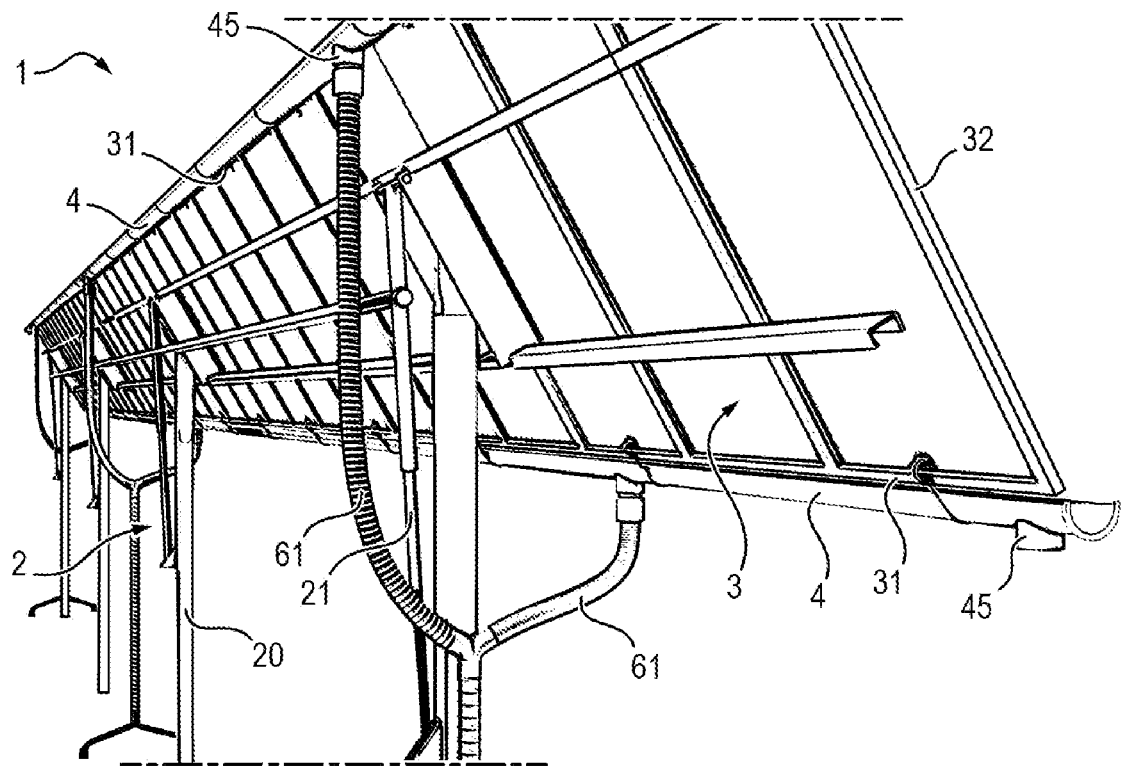
[Fig. 3]
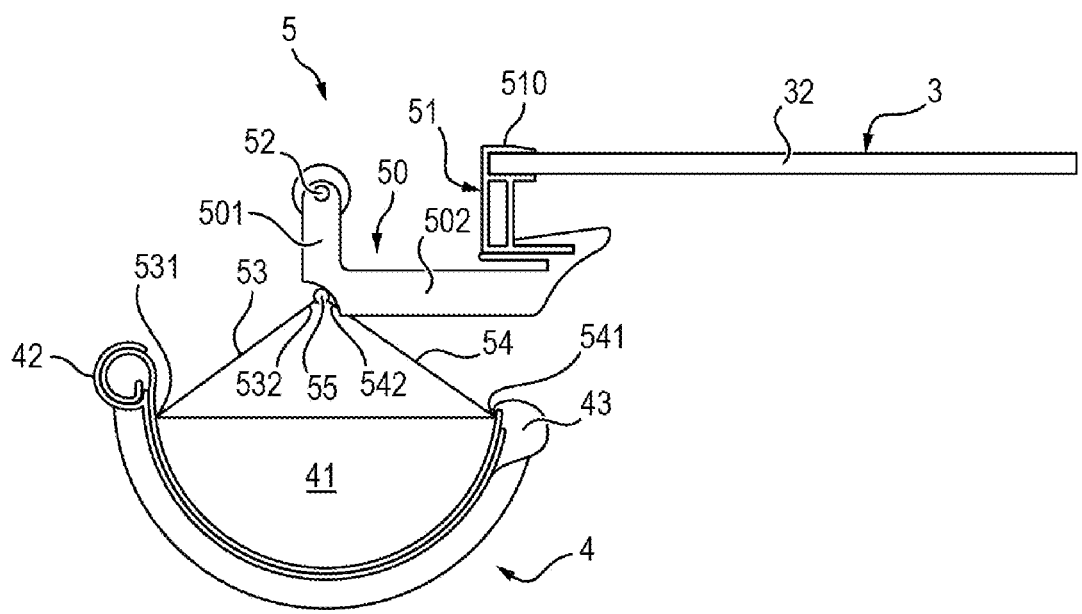

[Fig. 4]
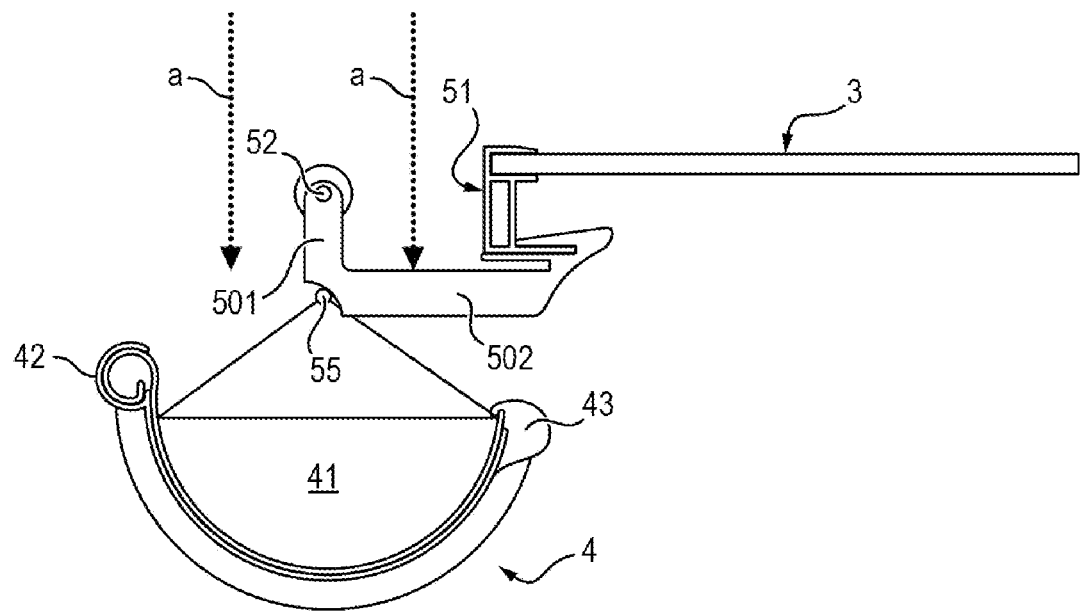

[Fig. 5]
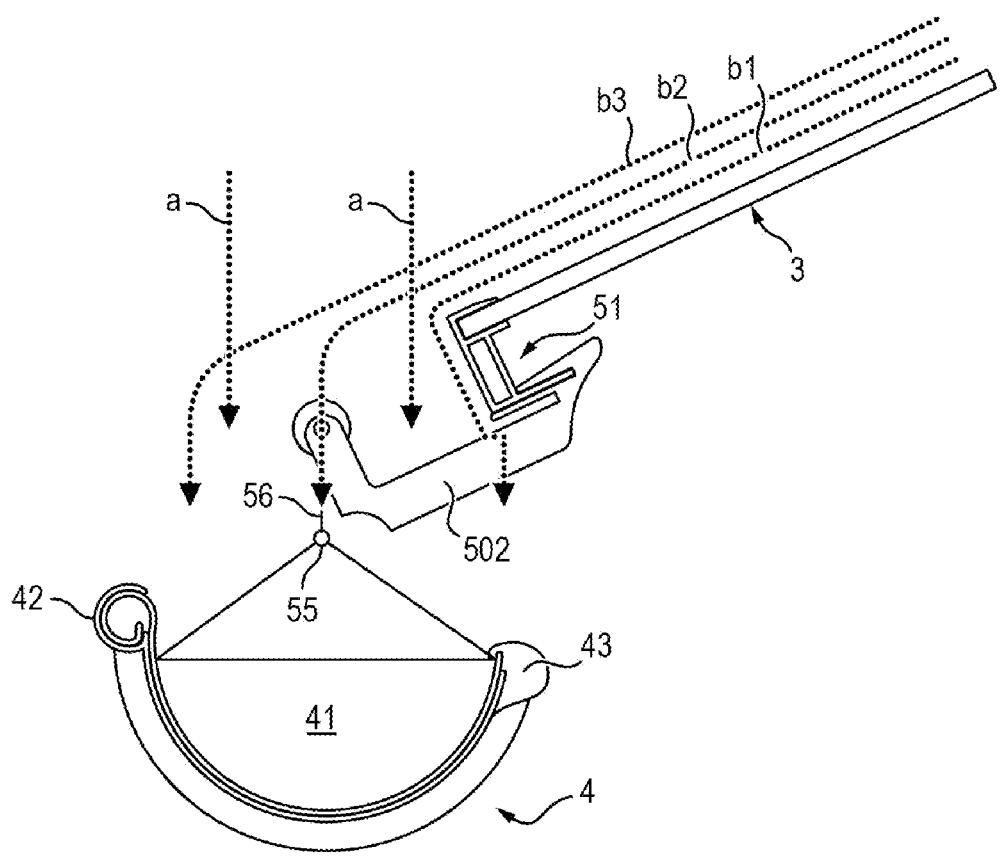

[Fig. 6]
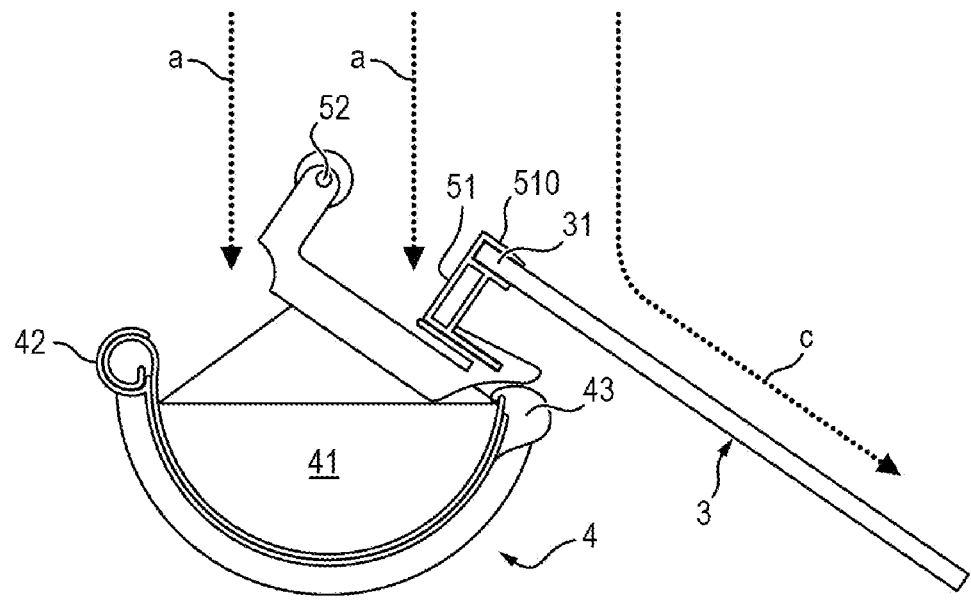
[Fig. 7]
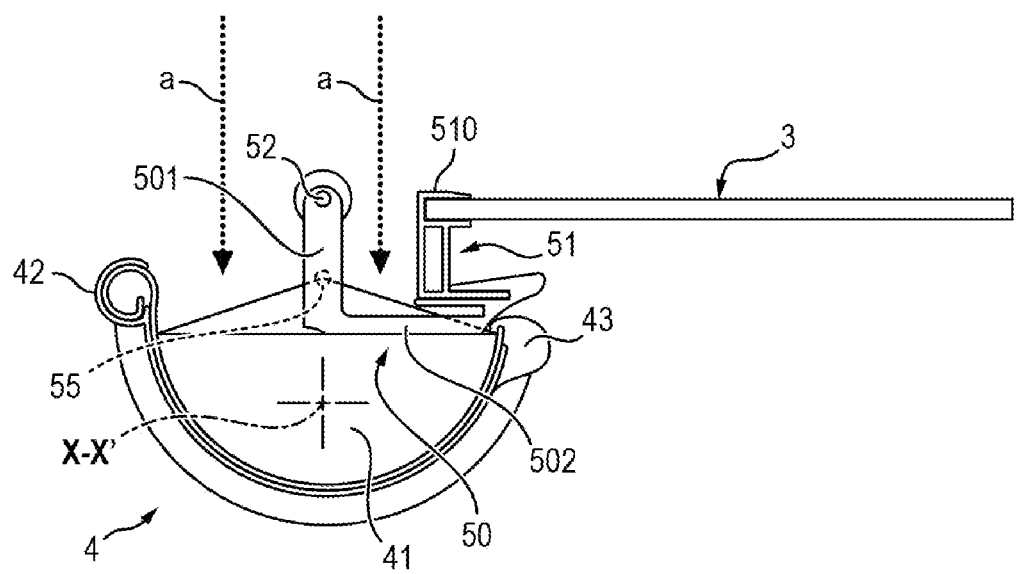

[Fig. 8]
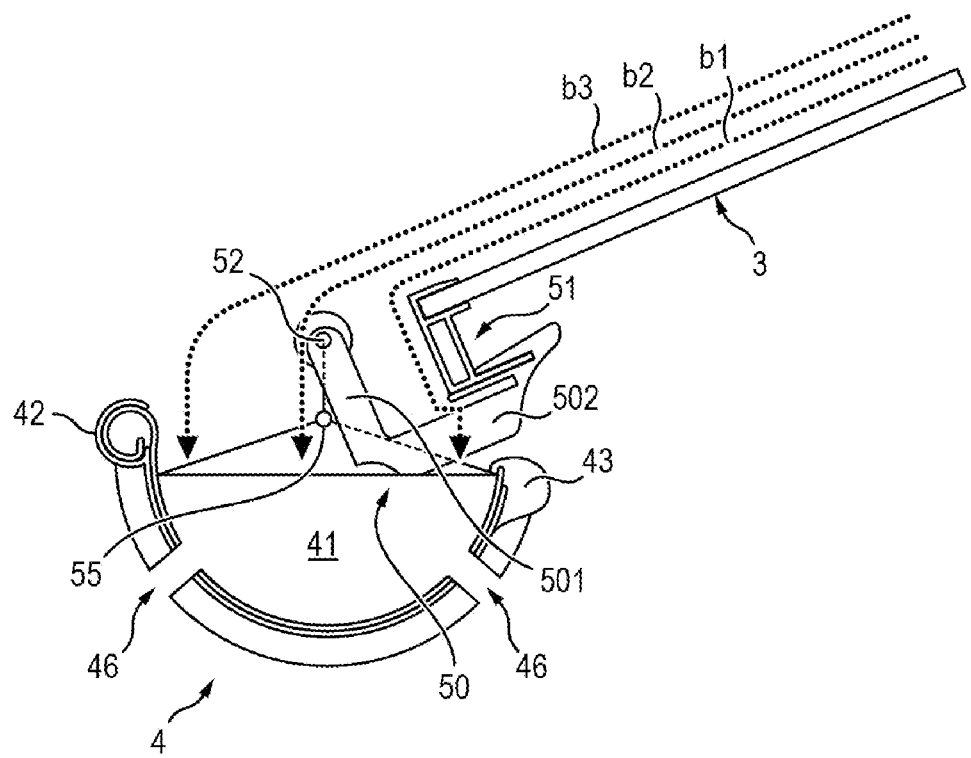
[Fig. 9]
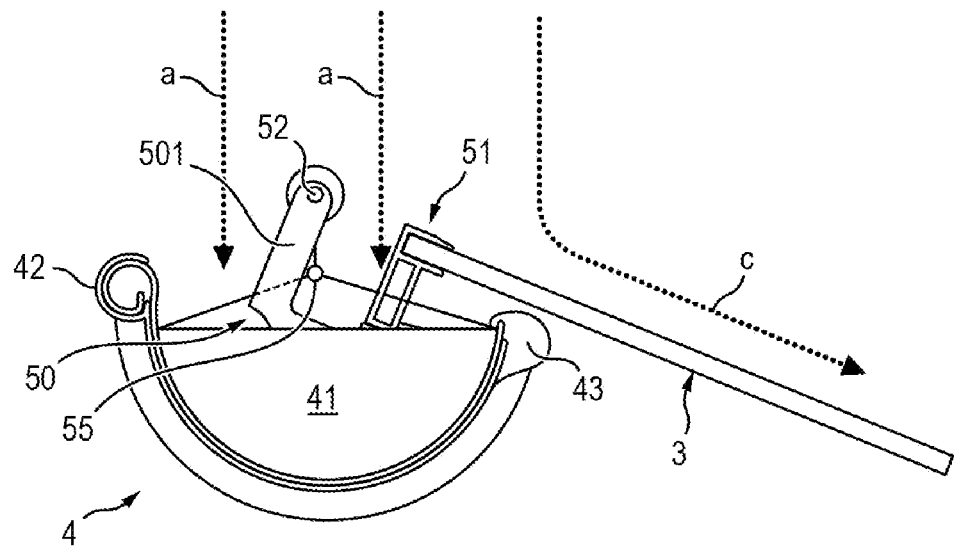

[Fig. 10]
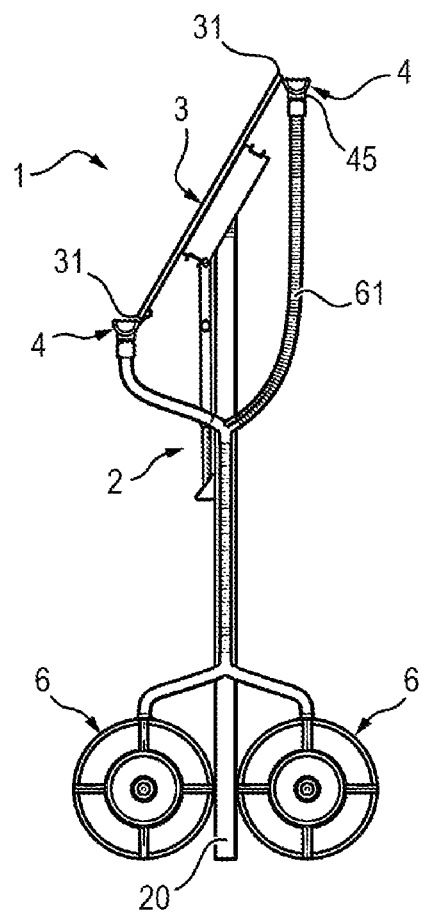

[Fig. 11]
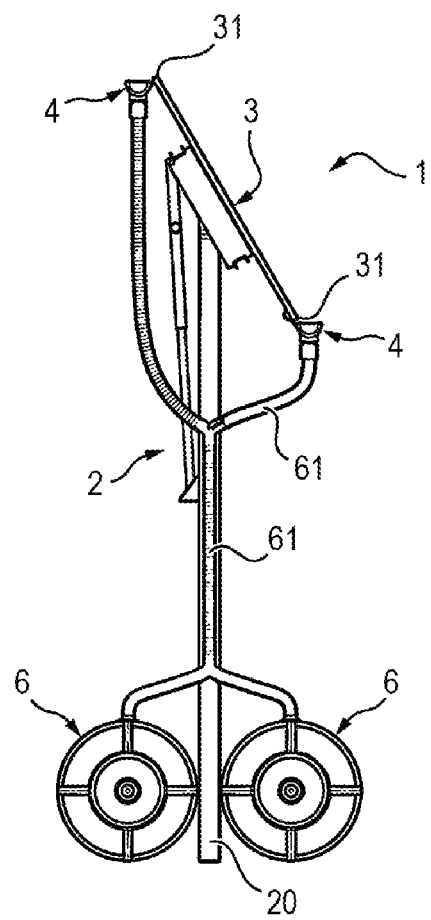

US 11,736,061 B2

PHOTOVOLTAIC FACILITY

CROSS-REFERENCE TO RELATED APPLICATIONS

The present application claims the benefit of the filing date of French Patent Application No. 2105423 filed May 25, 2021, the disclosure of which is hereby incorporated herein by reference.

FIELD OF THE INVENTION

The invention is in the field of photovoltaic facilities and, more particularly, agriphotovoltaics.

The present invention relates, more particularly, to a photovoltaic facility comprising a solar tracker and at least one photovoltaic panel mounted on said solar tracker, this solar tracker making it possible to vary the inclination of said photovoltaic panel with respect to the horizontal.

PRIOR ART

Agriphotovoltaics refers to the fact of carrying out a layered production, which combines production of photovoltaic electricity and agricultural production on a same surface.

The coexistence of photovoltaic panels and crops implies sharing the light between these two types of production. In order to do this, the photovoltaic panels (or solar panels) are mounted on a solar tracker, which makes it possible to vary their respective inclinations in order to best follow the position of the sun.

The fact of being able to orient these photovoltaic panels also makes it possible to recreate favourable conditions for good plant growth by limiting some of the effects of hail, heavy rainfall and late frosts, or even by protecting these plants from excessive sunlight during hot dry summers.

Furthermore, according to official figures, agriculture consumes nearly all the water that it withdraws from bodies of water or rivers. The impacts of these withdrawals are significant, since they are mainly concentrated during the three months of summer, a period during which agriculture can represent up to 80% of the water consumption in the area.

During summer, in order to cope with shortage of water resources during periods of low-water flow, the authorities are sometimes forced to take exceptional measures to limit or suspend water usage. Since agriculture is not considered a priority for water collection, compared to withdrawal for drinking water for example, rainwater is becoming an increasingly precious resource. The recovery of rainwater is therefore of prime importance.

The main problem relating to rainwater management arises from the structure of the agriphotovoltaic facilities themselves, where the photovoltaic panels are mounted on solar trackers. When it rains, the rainwater flows on the inclined photovoltaic panels, which has the effect of concentrating it on certain areas of crops located close to these panels, thus creating inhomogeneities in the provision of water, or even causing gullying of agricultural land.

It would therefore be desirable to have a homogeneous distribution of the water onto the crops.

Conversely, it would be desirable to remedy problems of drought during low-water flow periods (the lowest level of a body of water).

From the prior art, a solution is already known which recommends controlling the orientation of photovoltaic panels in order to bring them into the vertical position in the event of rain. Hence, water falls uniformly distributed on the crops located close to the photovoltaic panel. Whereas this solution solves the problem of a lack of homogeneity in the provision of water on the crops and avoids gullying of the land, it does not respond to the problem of drought.

DISCLOSURE OF THE INVENTION

The aim of the invention is to solve the above-mentioned problems and, in particular, to better distribute rainwater on the crops located under the photovoltaic panels or close to them and on the other hand to avoid problems of drought for these crops.

Another aim of the invention is to successfully solve this problem without reducing the agricultural surface and without obstructing the operation of the photovoltaic panels and solar trackers on which they are mounted.

To this effect, the invention relates to a photovoltaic facility comprising a solar tracker and at least one square or rectangular photovoltaic panel mounted on the solar tracker, this solar tracker enabling the inclination of the photovoltaic panel to be varied with respect to the horizontal, so that two opposite edges of the photovoltaic panel, referred to as horizontal edges, are always horizontal, or substantially horizontal, whatever the inclination of the photovoltaic panel.

According to the invention, this facility comprises at least one gutter for recovering rainwater, wherein this gutter is mounted along one of the two horizontal edges of the photovoltaic panel using at least two anchoring devices, to which it is suspended, so that it can oscillate under the action of its own weight, about a horizontal axis of rotation, so as to remain horizontal, or substantially horizontal, whatever the inclination of the photovoltaic panel.

Through these features of the invention, the gutter is a pendulous system and it remains permanently in a horizontal position. Hence, whatever the inclination of the one or more photovoltaic panels, the gutter makes it possible to recover the rainwater and prevent the flow of water that runs over the photovoltaic panel from concentrating at one point and causing gullying of the soil.

According to other advantageous and non-limiting features of the invention, taken alone or in combination:

said rainwater recovery gutter comprises a first longitudinal rim and a second longitudinal rim, each anchoring device comprises a support provided with a horizontal pivot and a fastening device on said photovoltaic panel, a first suspension cable, fastened at its first end to the first longitudinal rim of the gutter, a second suspension cable fastened at its first end to the second longitudinal rim of the gutter, the second end of the first suspension cable and the second end of the second suspension cable being fastened to a connection point of the first cable and of the second cable, and a third suspension cable which connects said connection point to the horizontal pivot, and the at least two anchoring devices are mounted on the photovoltaic panel so that their respective pivots are coaxial and define said horizontal axis of rotation;

said rainwater recovery gutter comprises a first longitudinal rim and a second longitudinal rim, each anchoring device comprises a support provided with a horizontal pivot and a fastening device on said photovoltaic panel, a first suspension cable, fastened at its first end to the first longitudinal rim of the gutter, a second suspension cable fastened at its first end to the second longitudinal rim of the gutter, the second end of the first suspension cable and the second end of the second suspension cable being fastened to said horizontal pivot, and the at least two anchoring devices are mounted on the photovoltaic panel so that their respective pivots are coaxial and define said horizontal axis of rotation;

the fastening device comprises a clamp which enables the horizontal edge of the photovoltaic panel to be clamped;

the horizontal pivot is a rotary damper pivot;

said photovoltaic panel comprises two opposite edges, referred to as lateral edges, perpendicular to the horizontal edges, said support has an L-shape with a first arm and a second arm, the horizontal pivot is fastened to the free end of the first arm and perpendicularly thereto, and the fastening device is fastened to the free end of the second arm, so that the support is fastened on the photovoltaic panel using the fastening device, so that the second arm extends in a direction which is parallel to the lateral edge of the photovoltaic panel and so that the pivot is horizontal;

the length of the second arm is such that the horizontal edge of the photovoltaic panel is located above the second longitudinal rim of the gutter when said photovoltaic panel is horizontal;

the facility comprises two anchoring devices which are fastened respectively to the two ends of the gutter;

said gutter has, in its bottom, at least one drain orifice provided with a drain connector, said photovoltaic facility comprises at least one rainwater storage tank and at least one flexible pipe connecting said drain connector of said gutter to this storage tank;

said gutter is pierced by a plurality of spray holes that can optionally be closed using valves.

DESCRIPTION OF THE FIGURES

Other features, aims and advantages of the invention will emerge from the following description, which is given purely by way of illustration and not being limiting and which should be read with reference to the attached drawings, in which:

FIG. 1 is a perspective view of the photovoltaic facility according to the invention, seen from the front.

FIG. 2 is a perspective view of the photovoltaic facility according to the invention, seen from the rear.

FIG. 3 is a front view of an embodiment of a part of the photovoltaic facility according to the invention, when the photovoltaic panel is horizontal.

FIG. 4 is a similar view to FIG. 3, showing the flow of rain on the facility.

FIG. 5 is a similar view to FIG. 3, showing the flow of rain on the facility, when the photovoltaic panel is inclined in a first direction.

FIG. 6 is a similar view to FIG. 3, showing the flow of rain on the facility, when the photovoltaic panel is inclined in a second direction opposite to the first direction.

FIG. 7 is a front view of an alternative embodiment of a part of the photovoltaic facility according to the invention, when the photovoltaic panel is horizontal.

FIG. 8 is a similar view to FIG. 7, showing the flow of rain on the facility, when the photovoltaic panel is inclined in a first direction.

FIG. 9 is a similar view to FIG. 7, showing the flow of rain on the facility, when the photovoltaic panel is inclined in a second direction opposite to the first direction.

FIG. 10 is an end view of the facility when this comprises rainwater storage tanks, the photovoltaic panel being inclined in a first direction.

FIG. 11 is an end view of the facility when this comprises rainwater storage tanks, the photovoltaic panel being inclined in a second direction opposite to the first direction.

DETAILED DESCRIPTION OF THE INVENTION

The photovoltaic facility according to the invention will now be described in conjunction with FIGS. 1, 2, 10 and 11.

In the rest of the description and the claims, the terms "horizontal", and "vertical", should be considered with respect to a terrestrial reference frame or the normal installation position of the facility 1, as shown in FIGS. 1 and 2.

This photovoltaic facility 1 comprises a solar tracker 2 and at least one photovoltaic panel (or solar panel) 3, mounted on this solar tracker.

The solar tracker 2 is a device which makes it possible to vary the inclination of one or more solar panels 3, with respect to the horizontal, so as to track the position of the sun.

Such a solar tracker 2 comprises, for example, a support leg 20 erected on the ground and an actuator 21, the body and rod of which are fastened, respectively, one to the support leg 20 and the other to the rear face of the solar panel 3.

Such a solar tracker 2 is well-known to a person skilled in the art and will not be further described in detail.

The photovoltaic panel 3 is square or rectangular and has four edges.

When the solar tracker 2 is actuated, it can move the photovoltaic panel 3 throughout the day, from a vertical or almost vertical position in which the panel is oriented for example towards the east, as shown in FIG. 10, to a vertical or almost vertical position in which the photovoltaic panel 3 is oriented for example towards the west, as shown in FIG. 11, by occupying a whole series of intermediate positions in order to track the position of the sun.

The panel 3 is mounted on the tracker device 2 so that during its movement, two of the opposite edges of the photovoltaic panel 3 remain horizontal or substantially horizontal. As a consequence, by convention, they are referred to in the rest of the description and claims as "horizontal edges" 31. The two other opposite edges of the photovoltaic panel 3 are referred to as "lateral edges" and are given reference sign 32. The term "substantially horizontal" shall mean that this edge 31 can optionally deviate up to a maximum of 15° from the horizontal.

The photovoltaic facility 1 also comprises at least one rainwater recovery gutter 4.

As best seen in FIG. 1, each gutter 4 extends along a central longitudinal axis X-X'. It preferably has a semicircular cross-section. It is closed at each of its two ends by end partitions 41. Finally, each gutter 4 has two parallel longitudinal rims, a first longitudinal rim 42 and a second longitudinal rim 43 respectively.

Each gutter 4 is mounted along one of said horizontal edges 31 of a photovoltaic panel 3. In other words, each gutter 4 is mounted so that its longitudinal rims 42, 43 are parallel or substantially parallel to the horizontal edges 31 of the panel 3.

Advantageously, and as can be seen in FIGS. 2, 10 and 11, the facility comprises two gutters 4, mounted respectively along each of the horizontal edges 31 of the photovoltaic panel 3.

In addition, each gutter 4 is mounted along a horizontal edge 31 of the panel 3, using at least two anchoring devices 5. These two anchoring devices 5 are preferably disposed at the two ends of a gutter 4 or close to these two ends. For long gutters 4, it can also be envisaged to use more than two anchoring devices 5, distributed along the gutter in order to support it as uniformly as possible and to avoid its deformation.

A first embodiment of the anchoring device 5 will now be described in more detail, in conjunction with FIG. 3.

This anchoring device 5 is configured to enable the gutter 4 to be suspended from it. This gutter 4 can thus oscillate under the action of its own weight, about a horizontal axis of rotation Y-Y', so that it can move relative to the photovoltaic panel 3 in order to remain in a stable equilibrium position in which it is horizontal or substantially horizontal (i.e. within 15°), whatever the inclination of said photovoltaic panel 3. In other words, the gutter 4 is fastened to the photovoltaic panel 3 like a pendulum.

The axis of rotation Y-Y' is parallel to the longitudinal axis X-X' of the gutter 4.

The anchoring device 5 comprises a support 50, which is provided with a device 51 for fastening on the photovoltaic panel 3 and likewise with a pivot 52. The anchoring device 5 also comprises two suspension cables, namely a first cable 53 and a second cable 54.

The first cable 53 is fastened at its first end 531 to the first longitudinal rim 42 and at its second end 532 to a connection point 55 of the two cables, while the second cable 54 is fastened at its first end 541 to the second longitudinal rim 43 and at its second end 542 to the same connection point 55 of the two cables.

Finally, the anchoring device 5 comprises a third suspension cable 56, which connects the connection point 55 to the horizontal pivot 52. This third cable 56 is best seen in FIG. 5.

This embodiment is preferable because it makes it possible to prevent the second suspension cable 54 (in other words the one which is closest to the photovoltaic panel) from potentially touching the support 50, or even the photovoltaic panel 3, during pivoting movements of the gutter 4.

However, according to an alternative embodiment that is not shown in the figures, it would also be possible to fasten the second ends 532, 542 of the two cables 53, and respectively 54, directly to the horizontal pivot 52. In this case, care must be taken to adjust the length of the cables 53, 54, such that they do not come into the contact with the support 50 or with the panel 3, whatever the inclination of the latter.

The at least two anchoring devices are fastened to the solar panel so that their respective pivots 52 are aligned and coaxial and together define the horizontal axis of rotation (Y-Y') about which the gutter 4 can pivot.

The fastening device 51 is fastened on the support 50, for example by interlocking, screwing or welding, or is formed as a single piece with this support 50 and it comprises a fastening end, such as a clamp 510, which makes it possible to grip the horizontal edge 31 of the photovoltaic panel 3. The clamp 510 could also be replaced by any other device that can rigidly connect this fastening device 51 and the panel 3, for example a fastening with a screw and a bolt or a clamp fastening 510 using a pin (not shown in the figures).

Preferably, the support 50 has the form of an L-shaped plate, with two arms, namely a first arm 501 and a second arm 502.

Preferably, the fastening device 51 on the panel 3 is fastened to the free end of the second arm 502 so that when the fastening device 51 is mounted on the panel 3, the second arm 502 extends in a direction that is parallel to the lateral edge 32 of the panel. Furthermore, the horizontal pivot 52 is preferably fastened at the free end of the first arm 501 perpendicularly thereto. Hence, when the support 50 is fastened on the photovoltaic panel 3, the pivot 52 is horizontal.

The third cable 56 is mounted on the horizontal pivot 52, so that the gutter 4 can pivot freely or almost freely about it, and therefore about the axis of rotation X-X'.

However, according to an alternative embodiment, the pivot 52 can be a rotary damper pivot, designed to incorporate a brake mechanism. Such a rotary damper pivot can prevent the gutter 4 from being subject to swing amplitudes that are too large, when the photovoltaic facility 1 is subjected to violent winds. In this way, damage to the gutter 4 or its anchoring device 5 is avoided and good rainwater recovery is guaranteed. Several types of rotary damper pivot can be used, for example pivots with a mechanical, magnetic or viscous fluid damper, the latter solution being preferred.

Advantageously, the length of the second arm 502 is dimensioned so that the horizontal edge 31 of the photovoltaic panel 3 is above the second longitudinal rim 43 of the gutter 4, when the photovoltaic panel 3 is horizontal, so as to guarantee maximum rainwater recovery whatever this orientation.

Indeed, as can be seen in FIG. 4, when the photovoltaic panel 3 is arranged horizontal, the rainwater falls directly into the gutter 4 (see the arrows a) and the photovoltaic panel 3 does not obscure the opening of the gutter 4.

When the photovoltaic panel 3 is oriented according to a first inclination shown in FIG. 5, in which the gutter 4 is at a lower altitude than the panel 3, the rainwater continues to fall directly into the gutter 4 (see the arrows a) and the water which runs on the panel 3 also falls into the gutter 4, the arrows b1, b2 and b3 representing, respectively, water flows with higher and higher speed (the arrow b1 representing a light rain and conversely the arrow b3 a heavy downpour).

Finally, as can be seen in FIG. 6, when the photovoltaic panel 3 is orientated at a second inclination, in which the gutter 4 is located at a higher altitude than the panel 3, then the rain continues to fall directly into the gutter 4 (see the arrows a) and the water which runs on the panel 3 (arrow c) is drained towards the other horizontal edge 31 of the panel 3 and the other gutter 4, if this is present on the other horizontal edge 31.

Furthermore, it is noted that the distance between the connection point 55 and the pivot 52 can be variously adjusted. In other words, the length of the third cable 56 or the length of the first arm 501 can be adjusted, so as to move the gutter 4 closer to or further away from the panel 3.

Hence, in the first embodiment of the invention shown in FIGS. 3 to 6, the length of the first arm 501 is less than the length of the first arm 501 in the second embodiment of the invention, shown in FIGS. 7 to 9, the length of the third cable 56 being identical in the two cases.

In the embodiment of FIGS. 3 to 6, the rainwater recovery is less optimal since the distance between the horizontal edge 31 of the panel 3 and the bottom of the gutter 4 is larger. However, the rotation of the panel 3 does not interfere with the movement of the gutter 4.

Conversely, in the embodiment of FIGS. 7 to 9, the rainwater recovery is optimal since the distance between the horizontal edge 31 of the panel 3 and the bottom of the gutter 4 is smaller. However in this case, the support 50 is more likely to abut into the gutter 4, in particular when the photovoltaic panel 3 is inclined so that the gutter 4 is at a higher altitude than that of the panel 3, as shown in FIG. 9. In this last case, it can indeed be seen that the pivoting path of the support 50 is such that the second arm 502 moves to the inside of the volume of the gutter 4.

Furthermore, the trajectories of the rainwater which falls directly or which runs on the photovoltaic panel 3 are respectively the same in FIGS. 7, 8 and 9 as in FIGS. 4, 5 and 6 previously described, (identical reference signs for the arrows).

Furthermore, as previously disclosed and, in particular, depending on irregularities of the land on which the photovoltaic facility 1 is installed, it is possible that the edge 31 of the photovoltaic panel 3 and the gutter 4 are not strictly horizontal. However, it is possible to adjust the length of the third suspension cable 56 or that of the arm 502 of at least one of the anchoring devices 5 in order to bring the gutter 4 as close as possible to the horizontal.

In addition, advantageously and in order to manage the rainwater resource recovered in the gutters as well as well as possible, the photovoltaic facility 1 according to the invention also comprises at least one storage tank 6.

This storage tank 6 is advantageously disposed close to of the tracker device 2, for example under the photovoltaic panels 3. Moreover, each gutter 4 is then provided, in its bottom, with at least one drain orifice 44, which is extended towards the outside of the gutter by a drain connector 45. A flexible pipe 61 connects the tank 6 to the gutter 4, more precisely to said connector 45.

The recovered water can then be used in a device for irrigating crops.

Finally, according to an alternative embodiment shown only in FIG. 8, it is possible to provide a plurality of small spray holes 46, pierced through the wall of the gutter 4. This makes it possible to regulate the flow of water in the event of heavy precipitation.

Valves, which are not shown in the figure, can also be placed in front of these spray holes 46 and be moved on command in order to open or close these holes. Such spray holes 46 make it possible to distribute the water contained in the gutter 4 as with a shower head, in order to distribute the water as well as possible over the ground, including under the photovoltaic panels 3, under which a smaller quantity of water is generally distributed.

The invention claimed is:

1. A photovoltaic facility comprising a solar tracker and at least one square or rectangular photovoltaic panel mounted on said solar tracker, the photovoltaic panel comprising two opposite horizontal edges, the solar tracker enabling the inclination of the photovoltaic panel to be varied with respect to the horizontal, so that the two horizontal edges of the photovoltaic panel are always horizontal whatever the inclination of said photovoltaic panel, wherein the photovoltaic facility comprises at least one gutter for recovering rainwater, wherein the gutter comprises a first longitudinal rim and a second longitudinal rim, wherein the gutter is mounted along one of the two horizontal edges of the photovoltaic panel using at least two anchoring devices, to which the gutter is suspended, so that the gutter can oscillate under the action of the weight of the gutter, about a horizontal axis of rotation, so as to remain horizontal, or substantially horizontal, whatever the inclination of said photovoltaic panel, wherein each anchoring device comprises:
- a support provided with a horizontal pivot and a fastening device on said photovoltaic panel,
- a first suspension cable provided with a first end and a second end, the first end of the first suspension cable being fastened to the first longitudinal rim of the gutter,
- a second suspension cable provided with a first end and a second end, the first end of the second suspension cable being fastened to the second longitudinal rim of the gutter,
- the second end of the first suspension cable and the second end of the second suspension cable being fastened to the horizontal pivot either directly or by a third suspension cable which connects the horizontal pivot to a connection point of the second end of the first cable and of the second end of the second cable,
- and wherein the at least two anchoring devices are mounted on the photovoltaic panel so that the respective pivots of the anchoring devices are coaxial and define said horizontal axis of rotation.

2. The photovoltaic facility according to claim 1, wherein the fastening device comprises a clamp which enables the horizontal edge of the photovoltaic panel to be clamped.

3. The photovoltaic facility according to claim 1, wherein the horizontal pivot is a rotary damper pivot.

4. The photovoltaic facility according to claim 1, wherein the photovoltaic panel comprises two opposite lateral edges, perpendicular to the horizontal edges,
- wherein the support has an L-shape with a first arm and a second arm,
- wherein the horizontal pivot is fastened to a free end of the first arm and perpendicularly thereto,
- and wherein the fastening device is fastened to a free end of the second arm, so that the support is fastened on the photovoltaic panel using the fastening device, so that the second arm extends in a direction which is parallel to the lateral edge of the photovoltaic panel and so that the pivot is horizontal.

5. The photovoltaic facility according to claim 4, wherein the length of the second arm is such that the horizontal edge of the photovoltaic panel is located above the second longitudinal rim of the gutter when said photovoltaic panel is horizontal.

6. The photovoltaic facility according to claim 1, wherein the gutter has two ends and wherein the photovoltaic facility comprises two anchoring devices which are fastened respectively to the two ends of the gutter.

7. The photovoltaic facility according to claim 1, wherein the gutter has a bottom and at least one drain orifice in the bottom, the drain orifice being provided with a drain connector wherein the photovoltaic facility comprises at least one rainwater storage tank and at least one flexible pipe connecting said drain connector of said gutter to the storage tank.

8. The photovoltaic facility according to claim 1, wherein the gutter is pierced by a plurality of spray holes.

9. The photovoltaic facility according to claim 8, wherein the spray holes are closed by valves.

* * * * *